US012480360B2

(12) United States Patent
Miller

(10) Patent No.: US 12,480,360 B2
(45) Date of Patent: Nov. 25, 2025

(54) ROLLING SHUTTER SLAT

(71) Applicant: Qualitas Manufacturing Incorporated, Itasca, IL (US)

(72) Inventor: James V. Miller, Lake Villa, IL (US)

(73) Assignee: Qualitas Manufacturing Incorporated, Itasca, IL (US)

( * ) Notice: Subject to any disclaimer, the term of this patent is extended or adjusted under 35 U.S.C. 154(b) by 0 days.

(21) Appl. No.: 18/732,808

(22) Filed: Jun. 4, 2024

(65) Prior Publication Data

US 2024/0318498 A1 Sep. 26, 2024

Related U.S. Application Data

(63) Continuation of application No. 18/193,771, filed on Mar. 31, 2023, now Pat. No. 12,037,841, which is a continuation of application No. 16/175,514, filed on Oct. 30, 2018, now Pat. No. 11,661,792.

(60) Provisional application No. 62/578,934, filed on Oct. 30, 2017.

(51) Int. Cl.

*E06B 9/15* (2006.01)
*E06B 9/165* (2006.01)
*E06B 9/34* (2006.01)
*E06B 9/386* (2006.01)

(52) U.S. Cl.

CPC ................ *E06B 9/15* (2013.01); *E06B 9/165* (2013.01); *E06B 9/34* (2013.01); *E06B 9/386* (2013.01); *E06B 2009/1505* (2013.01); *E06B 2009/1538* (2013.01); *E06B 2009/1544* (2013.01)

(58) Field of Classification Search

CPC ..... E06B 2009/1594; E06B 2009/1505; E06B 2009/1533; E06B 2009/1538; E06B 2009/1544; E06B 2009/1577; E06B 2009/1583; E06B 2009/1588; E06B 9/15; E06B 9/165; E06B 9/34; E06B 9/386

See application file for complete search history.

(56) References Cited

U.S. PATENT DOCUMENTS 7,457 A * 6/1850 Johnson .................... E06B 9/15 160/133
546,858 A * 9/1895 Kinnear .................. E06B 3/485 160/232

(Continued)

FOREIGN PATENT DOCUMENTS

DE 3400098 A1 * 1/1984
FR 1364924 A * 7/1963
FR 1584428 A * 9/1968

OTHER PUBLICATIONS

Translation of DE 3400098 (Year: 1985).*

*Primary Examiner* — Johnnie A. Shablack
(74) *Attorney, Agent, or Firm* — Ice Miller LLP

(57) ABSTRACT

A slat for a rolling shutter is provided that is formed as a single walled, continuous bent sheet. The slat includes a body having a hook-shaped engaging track at a first end, and a receiving track at the second end comprising a guard member and a hook-shaped lip member that form a pocket for receiving the engaging track of another slat. The guard member includes a portion of the sheet that is bent over on itself. The lip member extends from the guard member, and is spaced apart from the guard member to define an aperture that is sized and shaped to receive the engaging track of the other slat.

13 Claims, 7 Drawing Sheets

(56) References Cited

U.S. PATENT DOCUMENTS 671,444 A * 4/1901 Kinnear ........ E06B 9/15 160/235
677,123 A * 6/1901 Ebner ........ E06B 9/15 160/235
746,307 A * 12/1903 Ebner ........ E06B 9/15 D25/48.4
759,447 A * 5/1904 Kinnear ........ E06B 9/15 160/235
806,174 A * 12/1905 McCloud ........ E06B 9/15 160/235
827,677 A * 7/1906 Vance ........ E06B 3/485 160/237
830,456 A * 9/1906 Schultes ........ E05D 15/165 160/229.1
876,593 A * 1/1908 Rush ........ E06B 9/15 D25/48.1
880,701 A * 3/1908 Vance ........ E06B 9/15 160/235
897,990 A * 9/1908 McCloud ........ E06B 9/15 160/235
949,789 A * 2/1910 Wilson ........ E06B 9/15 114/202
994,440 A * 6/1911 Brunst ........ E06B 9/15 160/235
1,014,315 A * 1/1912 McCloud ........ E06B 9/15 160/133
1,081,485 A * 12/1913 Cahill ........ E06B 9/15 160/235
1,081,486 A * 12/1913 Cahill ........ E06B 9/15 160/235
1,367,240 A * 2/1921 Cornell ........ E06B 9/15 160/133
1,406,303 A * 2/1922 Tomkinson ........ E06B 9/15 160/235
1,408,076 A * 2/1922 Bretos ........ E06B 9/15 160/229.1
1,437,947 A * 12/1922 Probert ........ E06B 9/15 49/92.1
1,579,839 A * 4/1926 Raper ........ E06B 9/15 D6/580
1,632,219 A * 6/1927 Deller ........ E06B 9/15 D25/48.4
1,643,074 A * 9/1927 Lavagnino ........ E06B 9/15 160/235
1,707,287 A * 4/1929 Sudzki ........ E06B 9/15 160/235
1,872,652 A * 8/1932 Best ........ E06B 9/115 16/355
1,918,415 A * 7/1933 Miller ........ E06B 9/58 160/133
2,019,379 A * 10/1935 Anderson ........ E06B 9/15 160/235
2,093,054 A * 9/1937 Negrini ........ E06B 9/15 72/196
2,099,408 A * 11/1937 Packert ........ E06B 9/15 29/434
2,164,681 A * 7/1939 Fould ........ E04C 2/08 428/116
2,301,845 A * 11/1942 Anderson ........ E06B 9/15 160/235
2,495,963 A * 1/1950 Greegor ........ E06B 9/15 403/345
2,545,400 A * 3/1951 White ........ E04F 10/08 160/133
2,585,627 A * 2/1952 Cornell ........ E06B 9/17 160/180
2,809,017 A * 10/1957 Lip ........ E04H 17/166 52/630
2,954,081 A * 9/1960 Recchione ........ E06B 9/17 160/219
3,067,814 A * 12/1962 Russell ........ E06B 3/486 160/235
3,131,794 A * 5/1964 Bender ........ E04F 13/12 52/529
3,524,292 A * 8/1970 Bottom ........ E04D 3/363 52/522
4,042,005 A * 8/1977 Hammerstein ........ E06B 9/165 160/220
4,223,503 A * 9/1980 Hague ........ E04D 3/362 52/522
4,266,385 A * 5/1981 Oehlert ........ E04D 3/362 52/543
4,382,460 A * 5/1983 Ben-Tal ........ E06B 7/084 160/236
4,433,714 A * 2/1984 Barber ........ E06B 9/15 160/235
4,470,444 A * 9/1984 Riexinger ........ E06B 9/15 160/235
4,723,588 A * 2/1988 Ruppel ........ E06B 9/165 160/235
5,210,924 A * 5/1993 Schneider ........ E06B 9/165 160/235
5,611,383 A * 3/1997 Hoffman ........ E06B 9/165 160/133
5,725,201 A * 3/1998 Parth ........ E04C 2/20 256/73
5,850,862 A * 12/1998 Miller ........ E06B 9/15 160/183
6,006,815 A * 12/1999 Schanz ........ E06B 9/17076 160/133
6,085,822 A * 7/2000 Miller ........ E06B 9/58 160/183
6,095,225 A * 8/2000 Miller ........ E06B 9/171 160/133
6,279,641 B1 * 8/2001 Malott ........ E04F 10/08 160/67
7,357,171 B2 * 4/2008 Miller ........ E06B 9/15 160/133
7,743,815 B2 * 6/2010 Clauss ........ E06B 9/15 160/133
7,784,522 B2 * 8/2010 Miller ........ E06B 9/15 160/133
8,365,801 B1 * 2/2013 Motosko ........ E06B 9/15 160/133
8,584,731 B1 * 11/2013 Konrad ........ E06B 9/15 160/133
8,616,261 B2 * 12/2013 Miller ........ E06B 9/581 160/183
8,746,321 B2 * 6/2014 Miller ........ E06B 9/15 160/310
8,857,497 B1 * 10/2014 Konrad ........ E06B 9/15 160/183
8,944,137 B2 * 2/2015 Miller ........ E06B 9/15 160/235
9,074,411 B2 * 7/2015 Miller ........ E06B 9/34
9,534,441 B2 * 1/2017 Allen ........ E06B 9/13
10,465,440 B2 * 11/2019 Miller ........ E06B 9/15
10,794,112 B2 * 10/2020 Lambridis ........ E06B 9/70
11,047,170 B2 * 6/2021 Wong ........ E06B 9/17046
11,661,792 B2 * 5/2023 Miller ........ E06B 9/15 160/238
12,037,841 B2 * 7/2024 Miller ........ E06B 9/386
2007/0137802 A1 * 6/2007 Lukasik ........ E06B 9/15 160/235
2011/0108210 A1 * 5/2011 Wang ........ E06B 9/15 160/133

* cited by examiner

ROLLING SHUTTER SLAT

CROSS-REFERENCE TO RELATED APPLICATIONS

This application is a continuation of prior application Ser. No. 18/193,771, filed Mar. 31, 2023, which is a continuation of prior application Ser. No. 16/175,514, filed Oct. 30, 2018, now U.S. Pat. No. 11,661,792, which claims the benefit of U.S. Provisional Application No. 62/578,934, filed Oct. 30, 2017, which are hereby incorporated by reference herein in their entirety.

BACKGROUND OF THE INVENTION

The present invention relates to rolling shutters and, in particular, to a slat for a rolling shutter that minimizes the profile of the retracted rolling shutter and that may be formed from sheet metal.

Rolling shutters are commonly used in commercial, retail and residential applications as doors or to cover windows or other openings. The rolling shutter is made of a series of linked slats that hang from a spindle to cover a doorway, window or other opening of a building or fixture. When not in use, the rolling shutter is retracted by winding the slats about the spindle to form a roll.

The shutter slats typically have an upper edge with a hook-shaped engagement track, and a lower edge with a receiving track that forms a pocket for receiving the engagement track. The receiving track commonly comprises a branched structure with two elements—a complementary hook-shape for engaging the hook-shaped engagement track, and a guard that restricts the disengagement of the engagement track from the receiving track. The shutter slats are linked by the slidable engagement of the hook-shaped engagement track of a first slat in the pocket of the receiving track of a second slat, to form a loosely articulated hinge between the slats. An example of a shutter slat design is described in U.S. Pat. No. 8,944,137 to Miller, which is incorporated herein by reference.

The opening that is covered by the rolling shutter may be framed by guides or side tracks that keep the slats aligned and secure the rolling shutter within the opening. The rolling shutter incorporates an end retention system for engaging the side tracks. A cavity or a receptacle is typically formed within or adjacent to the receiving track for receiving an end retention device. An example of an end retention system is described in U.S. Pat. No. 8,616,261 to Miller, which is incorporated herein by reference.

Shutter slats are commonly manufactured by extrusion to produce the complex geometry and branched structure of the engaging and receiving tracks. Consequently, shutter slats are often made of plastic or relatively soft metals, such as aluminum. It would be preferable to produce the shutter slats from sheet metal, such as sheet steel which is significantly less expensive than aluminum as well as stronger and more resistant to damage. However, steel is difficult to work and the sheet metal cannot readily be formed into the complex profile of the shutter slat. Thus, it would be desirable to develop a shutter slat design and method for producing the slat using sheet metal, such as sheet steel.

SUMMARY OF THE INVENTION

A slat for a rolling shutter is disclosed, that comprises a single walled, continuous bent sheet that includes a curved body having first and second ends, and first and second sides. An engaging track is formed at the first end, having a first hook-shaped portion comprising a first bend curving toward the second side of the body. A receiving track is formed at the second end, that comprises a guard member and a lip member. The guard member includes a portion of the sheet that is bent over on itself. The lip member extends from the guard member and has a second hook-shaped portion comprising a second bend curving toward the first side of the body. The guard member and the lip member are spaced apart to define an aperture that is sized and shaped to receive the engaging track of another slat.

In another embodiment, a slat for a rolling shutter comprises a single walled, continuous bent sheet that includes a curved body having first and second ends, a first side with a convex curvature and a second side with a concave curvature. An engaging track is formed at the first end, having a first hook-shaped portion comprising a first bend curving toward the second side of the body. A receiving track is formed at the second end, comprising a guard member and a lip member. The guard member includes a portion of the sheet that is bent over on itself to form a base and an outer guard wall. The lip member extends from the base of the guard member and has a second hook-shaped portion comprising a bend curving toward the first side of the body. The guard member and the lip member are spaced apart to define an aperture that is sized and shaped to receive the engaging track of another slat.

In another embodiment, a slat for a rolling shutter comprises a single walled, continuous bent sheet that includes a curved body having first and second ends, a first side with a convex curvature and a second side with a concave curvature. An engaging track is formed at the first end, having a first hook-shaped portion comprising a first bend curving toward the second side of the body. A receiving track is formed at the second end, comprising a base extending from the second end, and a guard member extending from the base. The guard member includes a portion of the sheet that is bent over on itself. The lip member extends from the guard member and has a second hook-shaped portion comprising a bend curving toward the first side of the body. The base and guard member define an interior space. The guard member and the lip member are spaced apart to define an aperture that is sized and shaped to receive the engaging track of another slat.

In another embodiment, a slat for a rolling shutter comprises a single walled, continuous bent sheet that includes a curved body having first and second ends, a first side with a convex curvature and a second side with a concave curvature. An engaging track is formed at the first end, having a first hook-shaped portion comprising a first bend curving toward the second side of the body. A receiving track is formed at the second end, comprising a guard member extending from the second end, and a lip member extending from the guard member and having a second hook-shaped portion comprising a bend curving toward the first side of the body. The guard member and the lip member are spaced apart to define an aperture that is sized and shaped to receive the engaging track of another slat. A separately formed receptacle is coupled to the body adjacent to the receiving track, the receptacle having an interior space. In a further embodiment the first end of the body has a portion that is configured to be complementary to the shape of the receptacle.

In another embodiment, a slat for a rolling shutter comprises a bent, unbranched sheet that includes a body having a curvature with a convex side and a concave side, and opposite first and second ends. An engaging track is disposed at the first end of the body, and a receiving track is disposed at the second end of the body. The receiving track includes a guard member and a lip member that are spaced apart to define an aperture that is sized and shaped to receive an engaging track. The receiving track includes a portion of the sheet that is folded over on itself.

In another embodiment, a slat for a rolling shutter comprises a bent, unbranched sheet that includes a body having an outward facing side and an inward facing side, and opposite first and second ends. An engaging track is disposed at the first end of the body, and a receiving track is disposed at the second end of the body. The receiving track incudes an aperture that is sized and shaped to receive an engaging track. A separately formed receptacle that is sized and shaped to receive an end retention device is coupled to the inward facing side of the body.

In another embodiment, a slat for a rolling shutter comprises a bent, unbranched sheet that includes a body having a curvature with opposite outward facing and inward facing sides, and opposite first and second ends, where the outward facing side has a convex curvature and the inward facing side has a concave curvature. An engaging track disposed at the first end of the body and a receiving track disposed at the second end of the body. The receiving track includes an articulation space that is sized and shaped to receive an engaging track through an articulation space aperture, a receptacle sized and shaped to receive an end retention device, and a receptacle aperture. The receptacle aperture and the articulation space aperture open towards opposite facing sides of the body.

BRIEF DESCRIPTION OF THE DRAWINGS

Embodiments of the disclosure will now be explained in further detail by way of example only with reference to the accompanying figures, in which.

DETAILED DESCRIPTION OF THE INVENTION

Figure 1:
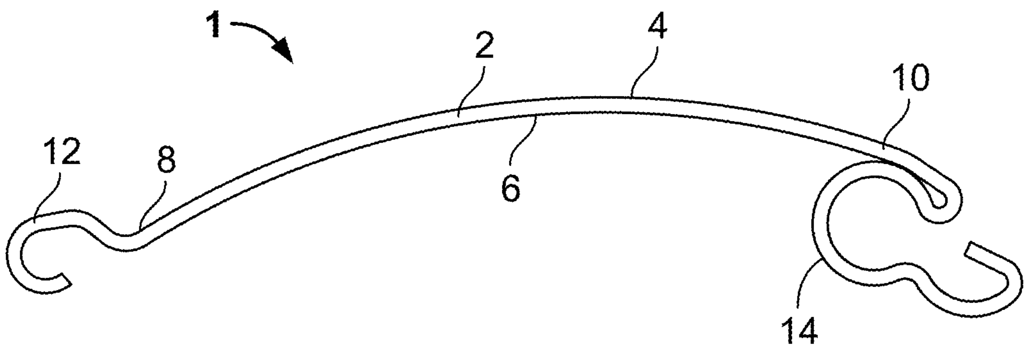
FIG. 1 is a side section view of a rolling shutter slat.

Referring to FIGS. 1-5, an embodiment of a shutter slat 1 is shown that comprises a single walled slat formed from a continuous, bent unbranched sheet that includes a curved body 2 with an outward facing side 4, an inward facing side 6, a first edge or end 8, and a second edge or end 10. As shown in FIG. 1, curved body 2 may be configured with outward facing side 4 having a convex curvature and inward facing side 6 having a concave curvature. A hooking or engaging track 12 is formed at first edge 8 of body 2, and a receiving track 14 is formed at second edge 10 of the body.

Figure 2:
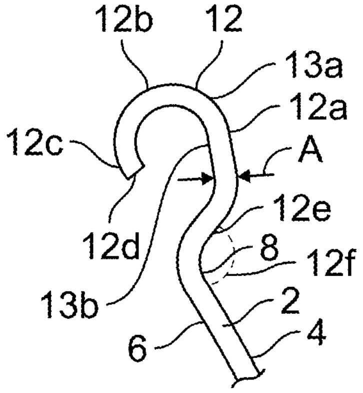
FIG. 2 is a detail view of the engaging track of the slat of FIG. 1.

As shown in FIG. 2, engaging track 12 includes a hook-shaped portion that comprises a shank 12*a*, a bend 12*b*, a barb 12*c* and a point 12*d*. Bend 12*b* curves back toward inward facing side 6 of body 2. Engaging track 12 may also include a base 12*e* that extends from first edge 8 at an angle to body 2. In the embodiment shown in FIG. 2, base 12*e* is configured such that engaging track 12 projects beyond (above) the convex curvature of outward facing side 4 of body 2, and barb 12*c* does not project beyond (below) the concave curvature of inward facing side 6 of the body. In an alternative embodiment, engaging track does not have a base 12*e*, and shank 12*a* may simply extend from first edge 8 along the curve of body 2 (not shown).

In examples where the engaging track 12 includes a base 12*e* that extends from the first edge 8, the shank 12*a* extends from the base 12*e*, the bend 12*b* extends from the shank 12*a*, the barb 12*c* extends from the bend 12*b*, and the point 12*d* is the end of the barb 12*c* and/or the terminus of the engaging track 12. The point 12*d* may also be a first end of the sheet forming shutter slat 1.

In further examples, the engaging track 12 includes a first face 13*a* disposed on the same side of the shutter slat 1 as the outward facing side 4 of the curved body 2. In some examples, the first face 13*a* extends from the point at which the outward facing side 4 of the curved body 2 ends, for example, at the first edge 8. The engaging track 12 may also include a second face 13*b* disposed on the same side of the shutter slat as the inward facing side 6 of the curved body 2. In some examples, the second face 13*b* extends from the point at which the inward facing side 6 of the curved body 2 ends, for example, at the first edge 8. The point 12*d* marks the place at which the first face 13*a* transitions to the second face 13*b*, and vice versa. As can be seen in FIG. 2, as the first face 13*a* travels from the first edge 8 and approaches the point 12*d*, at least a portion of the first face 13*a* faces the same direction as the inward facing side 6 of the curved body 2. Similarly, as the second face 13*b* extends from the first edge 8 and approaches the point 12*d*, at least a portion of the second face 13*b* faces the same direction as the outward facing side 4 of the curved body 2.

In examples where the base 12*e* extends from first edge 8 at an angle to body 2, a base angle 12*f* is formed between the outward facing side 4 (i.e., convex curved side) of the curved body 2 and the portion of the first face 13*a* extending along the base 12*e*. For example, there may be a bend in the metal sheet between the base 12*e* of the engaging track 12 and the first edge 8 of the body 2, which forms the base angle 12*f*. In some examples, the base angle 12*f* is less than 180°.

In further examples, the base angle 12*f* is between about 90° and about 180°. In even further examples, the base angle 12*f* is about 110° to about 140°.

Figure 3:
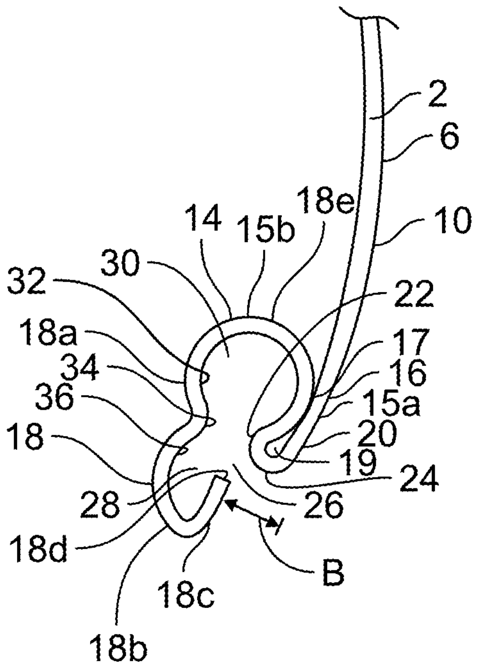
FIG. 3 is a detail view of the receiving track of the slat of FIG. 1.

As shown in FIG. 3, receiving track 14 forms a pocket for receiving the engaging track 12 of another slat, and includes a guard member 16 and lip member 18. Guard member 16 extends from edge 10 of body 2, and includes a portion of sheet 1 that is bent over or folded on itself to form an outer guard wall 20. In one embodiment, the portion of sheet 1 that is bent over on itself forms a bulge or bead, such as terminal loop 22 having a guard articulation surface 24. In a preferred embodiment, outer guard wall 20 extends along the same convex curvature defined by outward facing side 4 of body 2, and more preferably, outer guard wall 20 and outward facing side 4 of body 2 form a continuous convex curvature.

Lip member 18 extends from guard member 16, and includes a hook-shaped portion comprising a shank 18*a*, a bend 18*b*, a barb 18*c* and a point 18*d* that are sized and shaped to engage the engaging track 12 of another slat. Bend 18*b* curves back toward outward facing side 4 of body 2. In the embodiment shown in FIG. 3, lip member 18 extends from the portion of the sheet that is folded on itself, at a point that is proximal to end 10 of body 2. The hook-shaped portion of lip member 18 has a base 18*e* that is configured such that the lip member projects beyond (below) the concave curvature of inward facing side 6 of body 2, and barb 18*c* does not project beyond (above) the convex curvature of outward facing side 4 of the body.

In some examples, point 18*d* may be the second end of the sheet forming shutter slat 1. In some examples, the shutter slat 1 is comprised of a single continuous, unbranched sheet extending from point 12*d* of the engaging track 12 to point 18*d* of the receiving track 14. This is accomplished, in part, by the portion of the guard member 16 that is bent over or folded on itself, which allows the shutter slat 1 to be made of a single continuous sheet of material—e.g., steel—and bent into the desired shape, rather than being manufactured by extrusion.

In further examples, the receiving track 14 includes a first face 15*a* disposed on the same side of the shutter slat 1 as the outward facing side 4 of the curved body 2. In some examples, the first face 15*a* extends from the point at which the outward facing side 4 of the curved body 2 ends, for example, at the second edge 10. The receiving track 14 may also include a second face 15*b* disposed on the same side of the shutter slat as the inward facing side 6 of the curved body 2. In some examples, the second face 15*b* extends from the point at which the inward facing side 6 of the curved body 2 ends, for example, at the second edge 10. The point 18*d* marks the place at which the first face 15*a* transitions to the second face 15*b*, and vice versa. As can be seen in FIG. 3, as the first face 15*a* travels from the second edge 10 and approaches the point 18*d*, at least a portion of the first face 15*a* faces the same direction as the inward facing side 6 of the curved body 2, for example, as the first face 15*a* traverses the bulge 22. Similarly, as the second face 15*b* extends from the second edge 10 and approaches the point 18*d*, at least a portion of the second face 15*b* faces the same direction as the outward facing side 4 of the curved body 2.

In some examples, where the guard member 16 is bent over on itself, portions of the second face 15*b* may face one another. In further examples, where the guard member 16 is bent over on itself, the second face 15*b* may be bent over in such a way that a portion of the second face 15*b* contacts another portion of the second face 15*b* at a contact point 17. In further examples, where the guard member 16 is bent over on itself, the bulge 22 is formed by leaving a portion of the second face 15*b* open at a gap 19 between the two points at which the second face 15*b* comes in contact with itself. For example, when the guard member 16 is bent over on itself the portion of the second face 15*b* traversing the guard articulation surface 24 is open such that the gap 19 is formed where the second face 15*b* does not contact itself.

Lip member 18 and guard member 16 are spaced apart to form an aperture 26 that is sized and shaped to receive the engaging track 12 of another slat. In one embodiment, point 18*d* of the hook-shaped portion of lip member 18 and guard articulation surface 24 of guard member 16 are spaced apart to form aperture 26.

Lip member 18 and guard member 16 define an interior space within receiving track 14, that comprises an articulation space 28 formed between the lip member and guard member, that is sized and shaped to receive the hook-shaped portion of the engaging track 12 of another slat. In one embodiment, the interior space within receiving track 14 also includes a receptacle 30 formed between the lip member and guard member, that is sized and shaped to receive an end retention device, such as the screw and washer of an end retention system as described in U.S. Pat. No. 8,616,261. In a preferred embodiment, shank 18*a* of lip member 18 has an interior surface 32. A shoulder 34 on interior surface 32 divides or separates the interior space within receiving track 14 into articulation space 28 and receptacle 30, as shown in FIG. 3. Shoulder 34 may include a shoulder surface 36 that forms a bearing surface for the movement of the engaging track 12 of another slat within articulation space 28. In one embodiment, shoulder 34 is formed by an indentation of the sheet in shank 18*a*. In some examples, the interior surface 32 of shank 18*a* is a portion of the first face 15*a* of the receiving track 14. The receptacle 30 may be separated from articulation space 28 by the bulge 22 and the shoulder 34. In further examples, the receptacle 30 is defined by the portion of the first face 15*a* extending from the bulge 22 to the shoulder 34.

Figure 4:
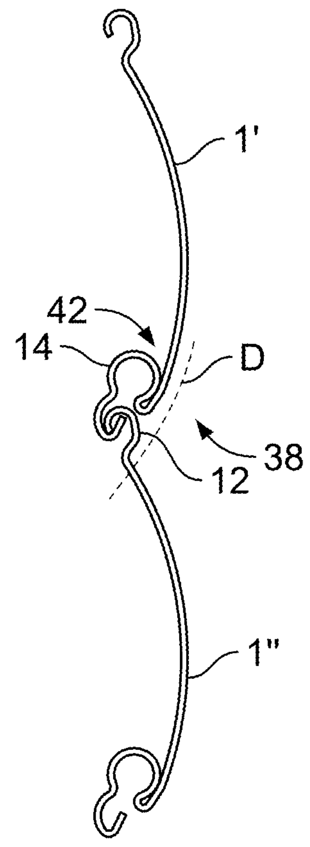
FIG. 4 is a side section view of two slats according to FIG. 1, of a rolling shutter in an extended position.

Referring to FIGS. 4-5, slats 1' and 1" are shown linked together by the engagement of track 12 of slat 1" in receiving track 14 of slat 1' to form a loosely articulated hinge 38. Guard member 16 of slat 1' limits the movement or articulation of the engaging track 12 of slat 1" within hinge 38 and prevents the accidental disengagement of the two slats. Guard articulation surface 24 of slat 1' (in combination with shoulder surface 36) provides a bearing surface for the articulation of engaging track 12 of slat 1" within hinge 38. Outer guard wall 20 of slat 1' includes a portion of the sheet that is bent over on itself, which provides additional strength and resistance to deformation of guard member 16 from the stress caused by articulation of hinge 38 and provides additional security from external forces that may be applied to hinge.

In one embodiment, engaging track 12 and receiving track 14 are configured to reduce the profile of hinge 38 when the rolling shutter is in the retracted position. As shown in FIGS. 2 and 3, the shank portion 12*a* of the engaging track 12 has a thickness A. Barb 18*c* of lip member 18 may be offset from guard member 16 by a distance B that is approximately the same as thickness A. As shown in FIG. 5, when the linked slats 1' and 1" are wound about a spindle 40 in the retracted position, the offset B allows shank 12*a* of the engaging track 12 of slat 1" to rest at or below (i.e. does not project beyond) the curvature C of outer guard wall 20 of guard member 16 (and outward facing side 4 of body 2) of slat 1'. This configuration minimizes the height of hinge 38 and reduces the diameter of the roll when the shutter slats are in the retracted position.

In another embodiment, engaging track 12 and receiving track 14 are configured to reduce the profile of the hinge 38 when the rolling shutter is in the vertical or extended position. As shown in FIG. 2, engaging track 12 may include a base 12*e* that extends from first edge 8 of body 2 at an angle to outward facing side 4. As shown in FIG. 4, when the linked slats 1' and 1" are in an extended position, the angle between base 12*e* of engaging track 12 and outward facing side 4 of body 2 (i.e., base angle 12*f*) may be configured such that engaging track 12 of slat 1" does not project beyond the curvature D of outer guard wall 20 of guard member 16 (and outward facing side 4 of body 2) of slat 1'. In a preferred embodiment, hinge 38 has approximately the same curve as body 2 of slat 1'—e.g., as shown in FIG. 4, where base 12*e* of engaging track 12 of slat 1" extends approximately along the same curvature D as outer guard wall 20 of guard member 16 and the convex curvature of outward facing side 4 of slat 1'. This configuration minimizes any projections or other discontinuities created by hinge 38 in the outer surface of the rolling shutter, that may provide a point for water or debris to collect and intrude into the hinge, or that may reduce security by providing a point to force apart slats at the hinge.

The slats are preferably configured such that the hinges of a set of slats wound about a spindle 50 are nested with adjacent hinges 48 to reduce the profile of the rolling shutter in the retracted position. For example, when a set of slats are wound about a spindle 50, there are multiple windings of slats with each successive winding increasingly distal to the spindle. In the example depicted in FIG. 5B an innermost (or first) winding is comprised of a first series of slats 5', where an engaging track 52' of each slat in the first series of slats 5' couples to the receiving track 54' of the preceding slat, forming a first hinge 48'. A second winding is comprised of a second series of slats 5", where the engaging track 52" of each slat in the second series of slats 5" couples to the receiving track 54', 54" of the preceding slat, forming a second hinge 48". The engaging track 52" of the first slat in the second series of slats 5" may be coupled to the receiving track 54' of the last slat in the first series of slats 5'.

Figure 5A:
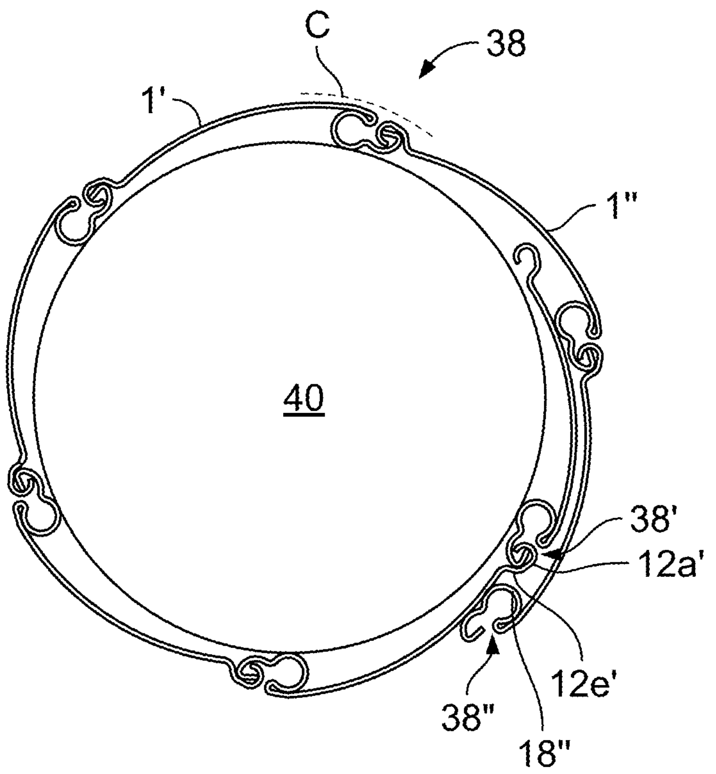
FIG. 5A is a side section view of a plurality of slats according to FIG. 1, of a rolling shutter in a retracted position.
Figure 5B:
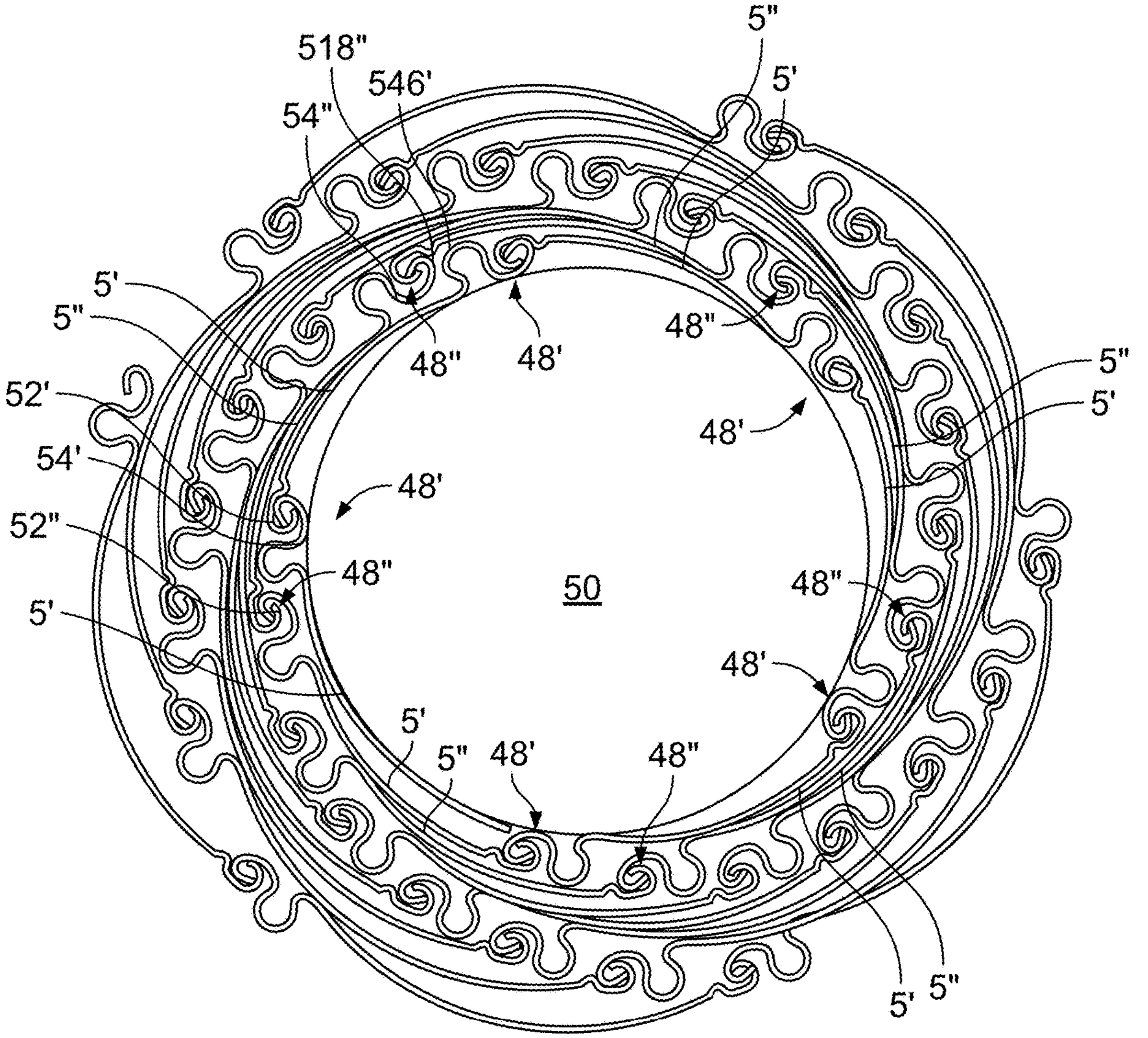
FIG. 5B is a side sectional view of a plurality of slats of an alternate embodiment of a rolling shutter in a retracted position.
Figure 10:
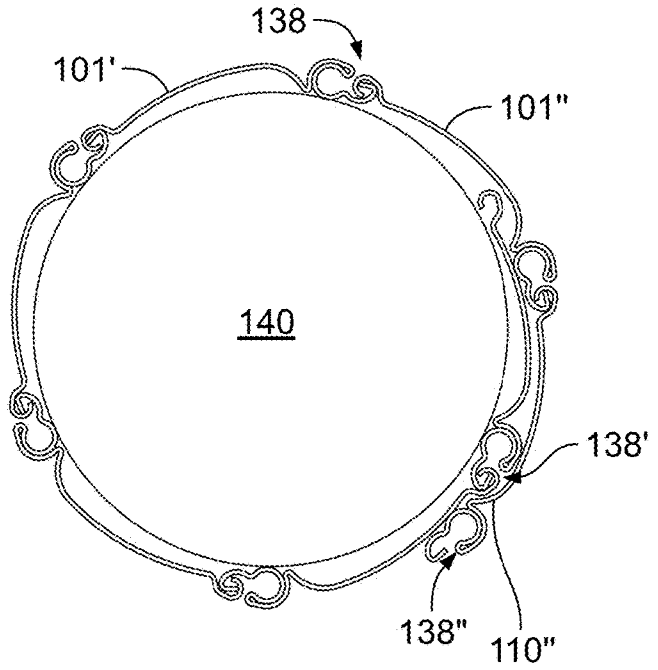
FIG. 10 is a side section view of a plurality of slats according to FIG. 6, of a rolling shutter in a retracted position.

In some examples, the second hinges 48" are nested adjacent to the first hinges 48', that is, each second hinge 48" is positioned circumferentially adjacent to the adjacent first hinge 48' rather than sitting radially adjacent to the first hinge 48'. In such examples, the receiving track of a hinge on an outer winding (e.g., the second winding comprised of the second series of slats 5") is adjacent to either the receiving track of a hinge on the immediately preceding winding (e.g., with respect to the second winding, the immediately preceding winding is the first winding comprised of the first series of slats 5') or the engaging track of a hinge on the immediately preceding winding. For example, in the example depicted in FIG. 5B, the second hinge 48" is positioned circumferentially adjacent to the first hinge 48' such that the receiving track 54" of the second hinge 48" is adjacent to the receiving track 54' of the first hinge 48'. In further such examples, the lip member 518" of the receiving track 54" of the second hinge 48" is adjacent to the base 546' of the receiving track 54' of the first hinge 48' (see further description below of alternative slat embodiment depicted in FIG. 14). Alternatively, as depicted in FIG. 5A, the location of the second hinge 38" (assuming an engaging track of another slat were coupled to the receiving track) is positioned circumferentially adjacent to the first hinge 38' such that the receiving track of the second hinge 38" is adjacent to the engaging track of the first hinge 38'. In further such examples, the lip member 18" of the receiving track of the second hinge 38" is adjacent to the base 12*e'* or shank 12*a'* of the engaging track of the first hinge 38'. Alternatively, as depicted in FIG. 10, the location of the second hinge 138" (assuming an engaging track of another slat were coupled to the receiving track) is positioned circumferentially adjacent to the first hinge 138' such that the second edge 110" of the second hinge 138" is adjacent to the engaging track of the first hinge 138' (e.g., the second edge 110" of the seond hinge 138" is adjacent to the base or shank of the engaging track of the first hinge 138'). In other examples, the receiving track of hinge of an outer winding may be disposed between the body of a slat in an immediately preceding winding and the body of a slat in an immediately successive winding. For example, in the example depicted in FIG. 5B, the receiving track 54" of the second hinge 48" (i.e., the hinge in the second winding) is disposed between the body of a slat in the first series of slats 5' (i.e., a slat in the immediately preceding first winding) and the body of a slat in an immediately successive third winding. The concepts described above may be expanded to cover sets of slats with any number of windings about a spindle 50. Additionally, the concepts described above may apply to sets of slats with the same or a different number of slats in each winding and/or where the slats in a given winding have the same or varying lengths.

In some examples, the rolling shutter may comprises slats of different lengths to facilitate tight nesting of first and second hinges 48', 48". Those of skill in the art will appreciate that each successive winding of the rolling shutter will increase in circumference. In the example depicted in FIG. 5B, the slats in the second series of slats 5" are longer than the slats in the first series of slats 5'. In some examples, increasing the length of a slat comprises increasing the length of the body of the slat. In a one embodiment, each winding is comprised of slats of the same length. Furthermore, each winding preferably comprises the same number of slats. However, those of skill in the art will appreciate that alternative rolling shutter configurations are possible where each winding comprises slats of different sizes and/or different numbers of slats. In examples where the hinges in a set of slats are configured to nest, such as the example depicted in FIG. 5B, the resulting fully wound set of slats (including all windings in the set) will have a smaller diameter than a set with the same number of slats but with hinges not in a nesting configuration. The smaller diameter, nested configuration, saves manufacturing cost for the housing in which the fully wound set of slats is stored by its ability to be in a smaller housing, which is also more visually appealing than a larger housing.

The slats in the rolling shutter preferably have engaging and receiving tracks that are the same size—e.g., the engaging track 52' for each slat in the first series of slats 5' is the same size as the engaging track 52" for each slat in the second series of slats 5" and the receiving track 54' for each slat in the first series of slats 5' is the same size as the receiving track 54" for each slat in the second series of slats 5"-such that the same tooling can be used to form all engaging and receiving tracks of all slats in the rolling shutter. The use of the same tooling for an entire set of slats allows for simpler and less-costly manufacturing procedures.

One factor that allows for the nesting configuration described above is the provision of a slat where a portion of the receiving track is formed to receive and/or enclose an end retention device. In conventional slat designs, a receptacle for receiving an end retention device must be coupled to the slat. In such examples, the space or volume taken by the end retention device is accounted for in the design of the receiving track, whereas in examples where the end retention device is otherwise coupled to a portion of the slat, the end retention device may interfere with a tightly nested configuration. For example, the receptacle 30 depicted in FIG. 3 (as well as the receptacle 130 depicted in FIG. 8, the receptacle 230 depicted in FIG. 11, and the receptacle 530 depicted in FIG. 14, discussed in further detail below) is a portion of the receiving track 14 formed to receive and/or enclose an end retention device. Alternatively, the slat can be designed to leave space for a separately formed receptacle capable of receiving an end retention device while still nesting with the hinges formed by coupled slats (for example, the separately formed receptacle 330 for coupling to the receiving track 314 in FIG. 12 and the well 452 for receiving a separately formed receptacle in FIG. 13).

In some cases, the configuration of the shutter slat may allow water to intrude into receiving track 14. In the embodiment shown in FIG. 4, the portion of sheet 1 that is bent over on itself to form an outer guard wall 20 creates a channel 42 on the inward facing side 6 of body 2, behind the outer guard wall. Water and debris may collect in channel 42, particularly when the rolling shutter is in the vertical or extended position. For example, condensation on the inward facing side 6 of the shutter slat may collect in channel 42 and infiltrate into guard member 16, between the bent over portions of outer guard wall 20. Multiple freeze/thaw cycles may cause expansion and deformation of outer guard wall 20, which may weaken hinge 38 or otherwise interfere with the operation of the rolling shutter.

Referring to FIGS. 6-10, an alternative embodiment of a shutter slat comprising single walled slat formed from a continuous, bent unbranched sheet 101 is shown that includes a curved body 102 with an outward facing side 104, an inward facing side 106, a first edge or end 108, and a second edge or end 110. Body 102 may be configured substantially as described above, with outward facing side 104 having a convex curvature and inward facing side 106 having a concave curvature. An engaging track 112 is formed at first edge 108 of body 102, and a receiving track 114 is formed at second edge 110 of the body. The configuration of engaging track 112 is substantially as described above, as shown.

Figure 6:
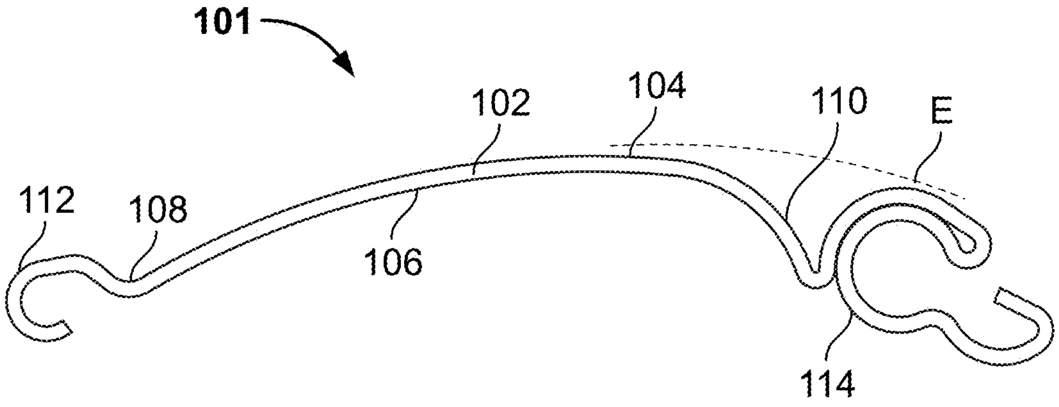
FIG. 6 is a side section view of another embodiment of a rolling shutter slat.
Figure 7:
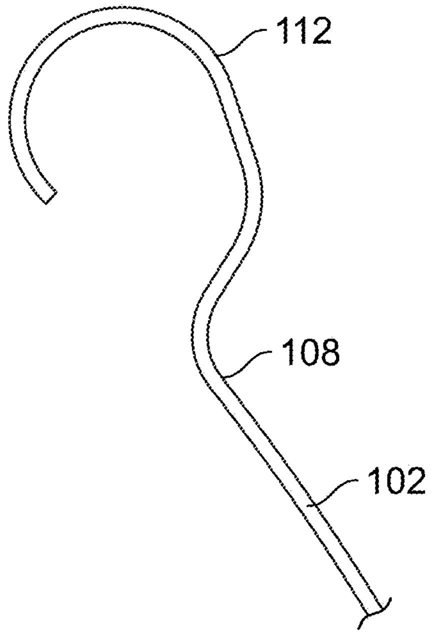
FIG. 7 is a detail view of the engaging track of the slat of FIG. 6.
Figure 8:
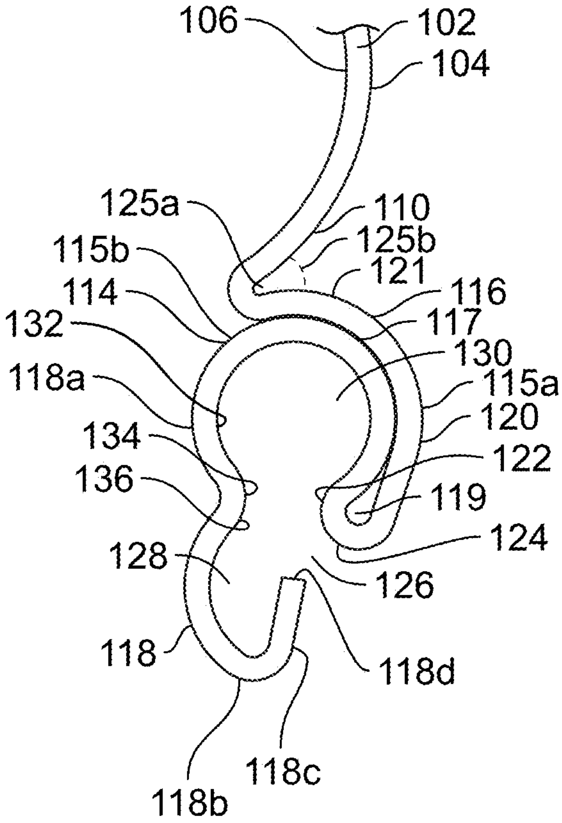
FIG. 8 is a detail view of the receiving track of the slat of FIG. 6.

Receiving track 114 is configured to reduce the infiltration of water into the guard member. As shown in FIG. 8, receiving track 114 includes a guard member 116 and a lip member 118. Guard member 116 extends from edge 110 of body 102, and includes a portion of sheet 101 that is bent over or folded on itself to form an outer guard wall 120 and a guard base 121. A bulge or bead, such as terminal loop 122 may be formed in outer guard wall 120, as described above. In a preferred embodiment, outer guard wall 120 extends approximately along the same convex curvature E defined by outward facing side 104, as shown in FIG. 6.

Receiving track 114 has the same general configuration and relationship to body 102 as previously described. In the embodiment shown in FIG. 8, lip member 118 extends from guard member 116, and includes a hook-shaped portion comprising a shank 118*a*, a bend 118*b*, a barb 118*c* and a point 118*d* that are sized and shaped to engage the engaging track 112 of another slat. Bend 118*b* curves back toward outward facing side 104 of body 102. Lip member 118 projects below the concave curvature of inward facing side 106 of body 102, and barb 118*c* does not project above the convex curvature of outward facing side 104 of the body. Lip member 118 and guard member 116 are spaced apart to form an aperture 126, preferably between point 118*d* of the hook-shaped portion of lip member 118 and guard articulation surface 124 of guard member 116. Barb 118*c* may be offset from outer guard wall 120 to minimize the height of hinge 138. Lip member 118 and guard member 116 also define an interior space within receiving track 114, comprising an articulation space 128 and a receptacle 130 for receiving an end retention device. A shoulder 134 on the interior surface 132 of shank 118*a* separates articulation space 128 and receptacle 130. Shoulder 134 may also provide a shoulder surface 136 that forms a bearing surface with guard articulation surface 124, for the movement of the engaging track 112 of another slat within articulation space 128.

Figure 9:
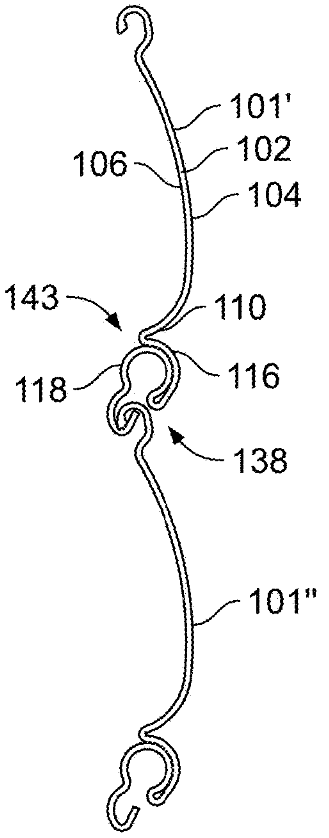
FIG. 9 is a side section view of two slats according to FIG. 6, of a rolling shutter in an extended position.

To reduce the accumulation of water, second edge 110 is positioned proximal to or at approximately the point 143 where lip member 118 extends from guard member 116, as shown in FIG. 8. This configuration effectively eliminates channel 42 of the embodiment shown in FIG. 4. When the rolling shutter is in the extended position as shown in FIG. 9, any water accumulating on the inward facing side 106 of the shutter slat will be diverted onto lip member 118, rather than collecting behind and infiltrating into guard member 116. As shown in FIGS. 9 and 10, this configuration does not significantly alter the profile of hinge 138 in comparison to the embodiment of FIGS. 4 and 5, in either the extended or retracted positions.

In one embodiment, edge 110 is formed with a curve having a greater degree of curvature than the curve of body 102 (e.g., as shown in FIG. 9). This configuration allows outer guard wall 120 to extend approximately along the same convex curvature E defined by outward facing side 104 of body 102, while edge 110 is positioned at point 143 where lip member 118 extends from guard member 116. In an alternative embodiment, edge 110 is formed with a curve having approximately the same degree of curvature than the curve of body 102 (not shown). For example, edge 110 and shank 118*a* of receiving track 114 may extend approximately along the concave curvature of inward facing side 106 of body 102, and preferably edge 110, shank 118*a* and inward facing side 106 of body 102 form a continuous concave curvature. In this alternative configuration, guard member 116 and lip member 118 project above the convex curvature E of outward facing side 104 of body 102, such that outer guard wall 120 no longer extends along convex curvature E of outward facing side 104 of body 102.

The receiving track 114 also includes a first face 115*a*, a second face 115*b*, and a gap 119 which have the same general configuration and relationship to body 102 and guard member 116 as the previously described first face 15*a*, second face 15*b*, and gap 19. In examples where the second edge 110 has a curve with a greater degree of curvature than the curve of body 102 (e.g., as shown in FIG. 8), a transition point 125*a* between the outward facing side 104 and the first face 115*a* of the guard member 116 will not be along the same general curvature of the curved body 102. For example, the transition point 125*a* forms a transition angle 125*b*. In some examples, the transition angle 125*b* is less than 180°. In further examples, the transition angle 125*b* is less than 90°. In even further examples, the transition angle 125*b* is between about 20° and about 70°.

In some examples, the guard member 116 is bent over or folded on itself much like the guard member 16 described and disclosed with respect to FIGS. 1-5. In examples where the edge 110 has a curve with a greater degree of curvature than the curve of body 102 (e.g., as shown in FIG. 8), a contact zone 117 is formed where the second face 115*b* of the bent over guard member 116 comes in contact with itself. For example, a portion of the second face 115*b* traversing the outer guard wall 120 comes in contact with a portion of the second face 115*b* traversing the shank 118*a*.

The rolling shutter may comprise individual slats having bodies with different lengths and curves. As shown in FIGS. 5 and 10, the rolling shutter in the retracted position typically comprises a series of linked slats 1', 1", etc. (101', 101", etc.), that are wound about a spindle 40 (140) in a plurality of successive windings. In a preferred embodiment, each winding will generally have the same number of slats, and the slats within each winding will have bodies with approximately the same length (measured from first to second edge) and with approximately the same curve. In a further preferred embodiment, the bodies of the slats in each successive winding will generally have increasing length and curves with a decreasing degree of curvature. The number of slats in each winding may vary according to the application and/or size of the rolling shutter. In one embodiment, each winding of the rolling shutter has at least 5 slats, and more preferably has six slats. Those of skill in the art will appreciate that it is possible for a rolling shutter to have a different number of slats in each winding, slats of different lengths in each winding and/or slats that do not strictly increase in length with each successive winding. However, such configurations generally will not permit rolling shutter designs that have the most compact configuration in the retracted position.

The shutter slat may be formed of various materials as are known in the art, including plastic and aluminum as are used in conventional extruded shutter slats. However, the shutter slat is designed to be formed as a single walled, continuous bent, unbranched sheet, which allows the use of materials that are not readily extruded. In one embodiment, the shutter slat is produced from a sheet of material, and preferably sheet steel. Various manufacturing techniques or combinations of techniques for forming or bending sheet metal may be used, as are known in the art, including punch and die, wiping die edge bending, rotary die bending, air bending, offset bending, single or multiple die bending, hemming, and roll forming or roll bending. Different tooling may be used for different slats within a winding and/or between windings of a rolling shutter. Similarly, different gauges of sheet metal thickness may be used for different slats within a winding and/or between windings of a rolling shutter.

Figure 11:
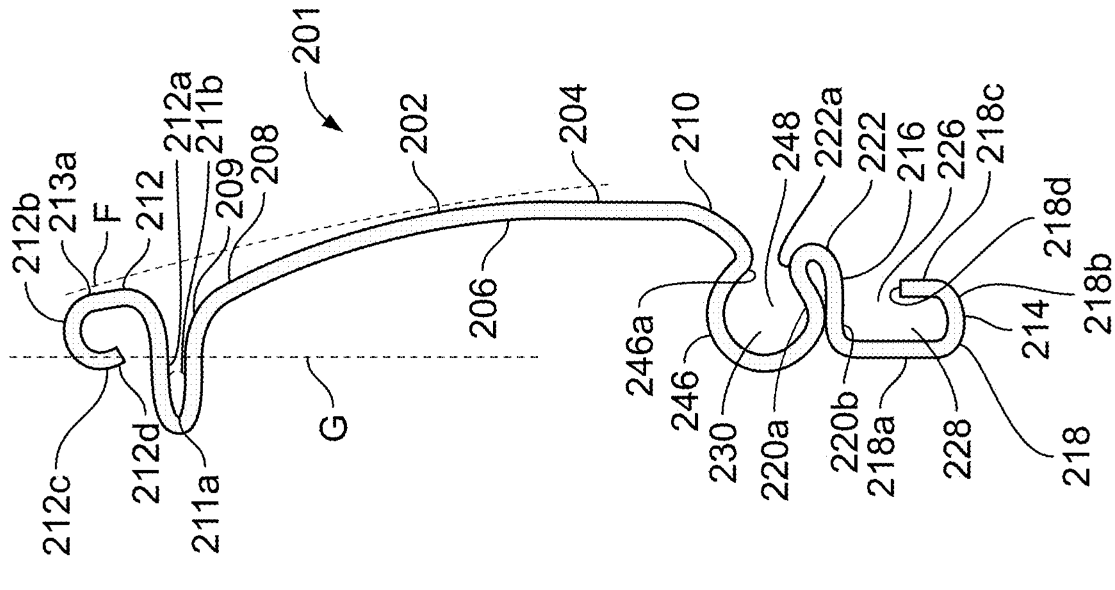
FIG. 11 is a side section view of an alternative embodiment of a rolling shutter slat.

Referring to FIG. 11, another embodiment of a shutter slat is shown having an alternative configuration of the guard member. The shutter slat 201 comprises a single walled, continuous bent, unbranched sheet having the same general configuration as the slats of FIGS. 1 and 6—e.g., including a curved body 202 with an outward facing side 204 having a convex curvature, an inward facing side 206 having a concave curvature, a first edge or end 208, and a second edge or end 210. A hooking or engaging track 212 is formed at first edge 208 of body 202, and a receiving track 214 is formed at second edge 210 of the body.

As shown in FIG. 11, engaging track 212 projects toward the outward facing side 204 of body 202, and includes a hook-shaped portion that comprises a base and/or shank 212*a*, a bend 212*b*, a barb 212*c* and a point 212*d*. In one embodiment, engaging track 212 does not project beyond the convex curvature F of outward facing side 204. Preferably, at least a portion of a bend 212*b* is positioned approximately along the convex curvature of outward facing side 204. In a further embodiment, edge 208 of body 202 may have a greater degree of curvature than the curve of body 202, to form an acute interior angle between base 212*a* and edge 208 of the body. This configuration preferably allows base 212*a* to follow more closely the bend of the lip member when engaged in the receiving track of another slat.

In some examples, the first edge 208 forms a first edge bend 209. In such examples, the first edge bend 209 forms an interior angle 211*b* between the engaging track 212 and the convex side (i.e., outward facing side 204) of the body 202. In some examples, the interior angle 211*b* formed by the first edge bend 209 is less than 180°. In other examples, the interior angle 211*b* formed by the first edge bend 209 is between about 45° and about 135°. In further examples, the interior angle 211*b* formed by the first edge bend 209 is about 90°. In further examples, the interior angle 211*b* formed by the first edge bend 209 is an acute angle. In some examples, a first face 213*a* of the engaging track 212 is disposed on the same side of the shutter slat 201 as the outward facing side 204 (i.e., the convex side) of the body 202. In examples where the convex curvature of the outward facing side 204 has a greater degree of curvature at the edge 208 (e.g., forming a first edge bend 209), a transition point 211*a* between the outward facing side 204 and the first face 213*a* of the engaging track 212 will not be along the same general curvature of the curved body 102. For example, the transition point 211*a* forms a transition angle (i.e., the interior angle 211*b*). In some examples, the transition angle is less than 180°. In further examples, the transition angle is less than 90°. In even further examples, the transition angle is between about 20° and about 70°. In some examples, such as the example depicted in FIG. 11, the transition point 211*a* extends in the inward direction such that it is disposed on the inward side of point 212*d* (i.e., is disposed on the inward side of a vertical plane G defined by the location of the point 212*d*). In other examples, the transition point 211*a* extends in the inward direction such that it is disposed on the outward side of point 212*d* (i.e., outward side of vertical plane G). In other examples, the transition point 211*a* extends in the inward direction such that it is disposed an inward amount about equivalent to that of the point 212*d*.

Receiving track 214 comprises a base 246, a guard member 216, and a lip member 218. Base 246 extends from edge 210 of body 202, and projects toward the inward facing side 206 of the body. Guard member 216 extends from base 246 and has a portion where sheet 201 is bent over on itself to form an outer guard wall 220*a*, an inner guard wall 220*b*, and a guard member end or point 222. In the embodiment shown in FIG. 11, outer guard wall 220*a* extends from base 246. Base 246 and outer guard wall 220*a* define an interior space or receptacle 230 for receiving an end retention device, such as the screw and washer of an end retention system as described in U.S. Pat. No. 8,616,261. An opening or aperture 248 into receptacle 230 may be formed between edge 210 of body 202 and guard member point 222. In one embodiment, base 246 may form a lip 246*a* at edge 210 and/or guard member point 222 may form a lip 222*a*, such that the width of aperture 248 is smaller than the interior width of receptacle 230 to assist in retaining an end retention device within receptacle 230.

Lip member 218 extends from guard member 216 and includes a hook-shaped portion comprising a shank 218*a*, a bend 218*b*, a barb 218*c* and a point 218*d* that are sized and shaped to engage the engaging track 212 of another slat. Bend 218*b* curves back toward outward facing side 204 of body 202. In the embodiment shown in FIG. 11, lip member 218 extends from inner guard wall 220*b*. Lip member 218 and inner guard wall 220*b* define an interior articulation space 228 within receiving track 214, that is sized and shaped to receive the hook-shaped portion of the engaging track 212 of another slat. Barb 218*c* and/or point 218*d* are spaced apart from inner guard wall 220*b* and/or end 222 to form an opening or aperture 226 into articulation space 228, that is sized and shaped to receive the engaging track 212 of another slat.

In one embodiment, receiving track 214 does not project beyond the convex curvature F of outward facing side 204 of body 202. Preferably, guard end 222 and/or at least a portion of a bend 218*b* are positioned approximately along the convex curvature F of outward facing side 204 of body 202. Articulation space aperture 226 and receptacle aperture 248 open toward the outward facing side 204 of body 202. Although the embodiment shown in FIG. 11 has a receiving track 214 and an engaging track 212 that do not project beyond the convex curvature F of outward facing side 204 of body 202, those of skill in the art will appreciate that the shutter slat may alternatively be configured with the reverse configuration—i.e. with a receiving track and/or an engaging track that do not project below the concave curvature of inward facing side 206 of the body. In this alternative configuration, articulation space aperture 226 and receptacle aperture 248 open toward the inward facing side 206 of body 202.

Figure 12:
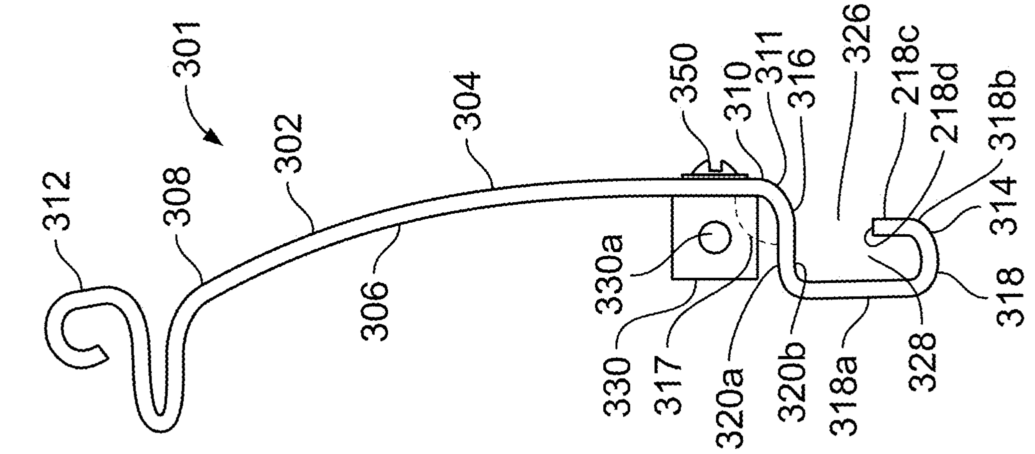
FIG. 12 is a side section view of an embodiment of a rolling shutter slat having a separately formed receptacle for an end retention system.

Referring to FIG. 12, another embodiment of a shutter slat is shown having a separately formed receptacle, which reduces the complexity of the shutter slat design. Shutter slat 301 comprises a single walled, continuous bent, unbranched sheet having the same general configuration as slat 201 of FIG. 11—e.g., including a curved body 302 with an outward facing side 304 having a convex curvature, an inward facing side 306 having a concave curvature, a first edge or end 308, and a second edge or end 310. A hooking or engaging track 312 is formed at first edge 308 of body 302, and a receiving track 314 is formed at second edge 310 of the body.

Receiving track 314 comprises a guard member 316 and a lip member 318. Guard member 316 extends from edge 310 of body 302, and projects toward the inward facing side 306 of the body 302. Guard member 316 has an inward facing side 320*a* and an outward facing side 320*b*. Lip member 318 extends from guard member 316, and has a hook-shaped portion comprising a shank 318*a* extending from the guard member, a bend 318*b*, a barb 318*c* and a point 318*d* that are sized and shaped to engage the engaging track 312 of another slat. Bend 318*b* curves back toward outward facing side 304 of body 302. Lip member 318 and guard member 316 define an interior articulation space 328 within receiving track 214, that is sized and shaped to receive the hook-shaped portion of the engaging track 312 of another slat. Barb 318*c* and/or point 318*d* are spaced apart from guard member 316 and/or edge 310 of body 302 to form an opening or aperture 326 into articulation space 328, that is sized and shaped to receive the engaging track 312 of another slat.

In some examples, the second edge 310 forms a second edge bend 311 where the receiving track 314 extends from the second edge 310. In such examples, the second edge bend 311 forms an interior angle 317 between the receiving track 314 and the concave side (i.e., inward facing side 306) of the body 302. In some examples, the interior angle 317 formed by the second edge bend 311 is less than 180°. In other examples, the interior angle 317 formed by the second edge bend 311 is between about 45° and about 135°. In further examples, the interior angle 317 formed by the second edge bend 311 is about 90°. In some examples, the interior angle 317 conforms to the shape of a receptacle.

A receptacle 330 with an interior space 330*a* for receiving an end retention device, may be formed separately from body 302 and coupled to inward facing side 306 of the body, preferably adjacent to or near receiving track 314. Receptacle 330 may be coupled to body 302 by various means known in the art, including welding, adhesive, or using a fastener. In the embodiment shown in FIG. 12, receptacle 330 is secured to body 302 by a fastener 350 such as a screw or rivet that passes through the body of the slat and into the receptacle. In an alternative embodiment, receptacle 330 may be similarly coupled to guard member 316 instead of or in addition to body 302. In some examples, the interior angle formed by the second edge bend 311 conforms to the shape of the receptacle 330. In further examples, the concave side of the body 302 (i.e., the inward facing side 306 of the body 302) at the second edge 310 of the body 302 and the receiving track 314 are sized and shaped to receive the receptacle 330.

In a preferred embodiment, receptacle 330 is coupled to body 302 at or near edge 310. Body 302 and/or receiving track 314 may be configured to receive receptacle 330. In one embodiment, the inward facing side 306 of body 302 and/or the inward facing side 320*a* of guard member 316 are configured to conform or be complementary to the size and shape of receptacle 330. For example, FIG. 12 shows a receptacle 330 with a rectangular or square cross-section. Inward facing side 306 of body 302 and inward facing side 320*a* of guard member 316 are configured to form a right angle that is complementary to the shape of the receptacle.

Figure 13:
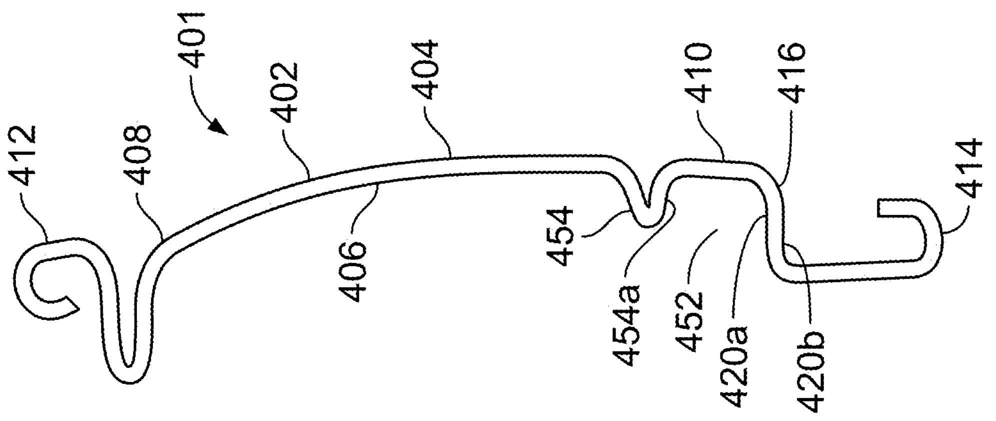
FIG. 13 is a side section view of another embodiment of a rolling shutter slat for use with a separately formed receptacle.

In another embodiment, the shutter slat may include a well that is configured to receive a separately formed receptacle. Referring to FIG. 13, a shutter slat 401 is shown that comprises a single walled, continuous bent, unbranched sheet having the same general configuration as slat 301 of FIG. 12—e.g., including a curved body 402 with an outward facing side 404 having a convex curvature, an inward facing side 406 having a concave curvature, a first edge or end 408, and a second edge or end 410. A hooking or engaging track 412 is formed at first edge 408 of body 402, and a receiving track 414 is formed at second edge 410 of the body. Receiving track 414 comprises a guard member 416 and a lip member 418. Guard member 416 extends from edge 410 of body 402, and projects toward the inward facing side 406 of the body. Guard member 416 has an inward facing side 420*a* and an outward facing side 420*b*.

Slat 401 forms a well 452 for receiving a separately formed receptacle, that is preferably positioned at or near edge 410 of body 402. In the embodiment shown in FIG. 13, a rib 454 is formed in body 402 that projects toward the inward side 406 of the body. Rib 454, inward facing side 406 of body 402, and guard member 416 define well 452 that is sized and shaped to receive a separately formed receptacle. For example, the surface 454*a* of rib 454, inward facing side 406 of body 402, and inward facing side 420*a* may form well 452 as a rectangular channel for receiving a receptacle with a square or rectangular cross-section (e.g., receptacle 330).

The receptacle may be secured in well 452 in the same manner described for coupling receptacle 330 to body 302. In another embodiment, well 452 may be configured to allow the receptacle to be friction fit within the well, in place of or in addition to other means of coupling the receptacle to the body 402. For example, rib 454 and guard member 416 may be spaced apart by a distance that is slightly smaller than the width of the receptacle. In other examples, rib 454 and guard member 416 may be spaced apart by a distance that is about the width of the receptacle.

Figure 14:
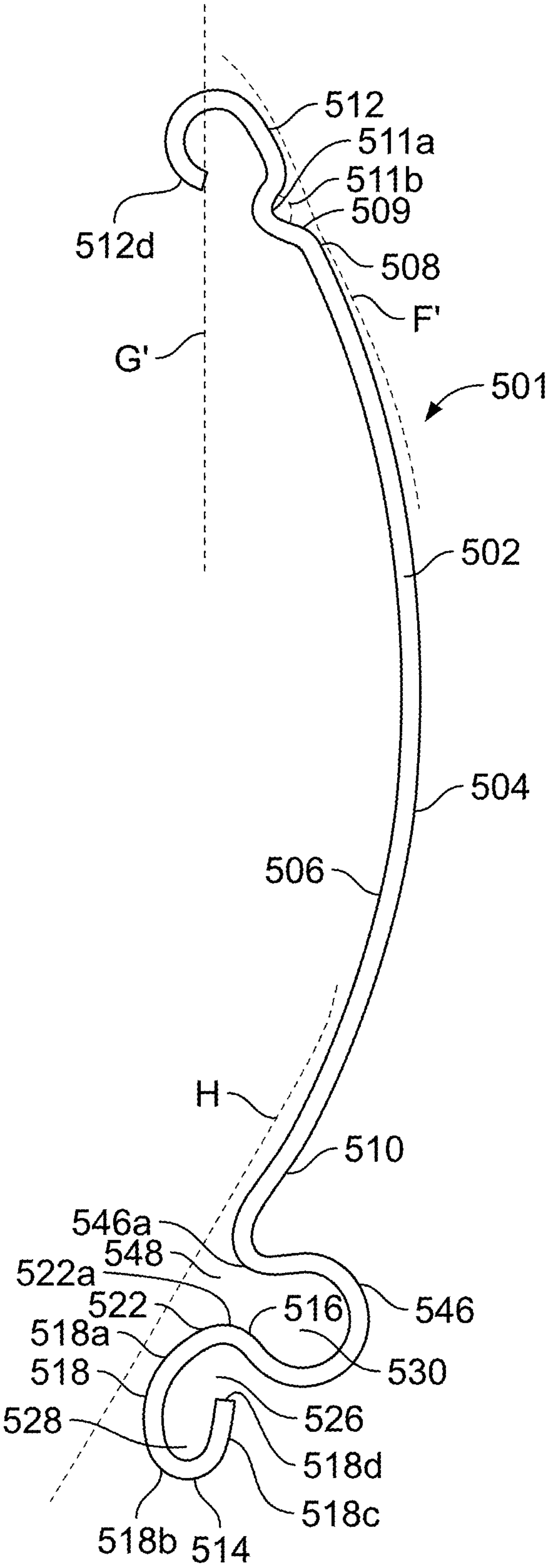
FIG. 14 is a side sectional view of a rolling shutter slat according to FIG. 5B.

Referring to FIG. 14, another example shutter slat 501 is depicted. Shutter slat 501 comprises a single walled, continuous bent, unbranched sheet having the same general configuration as slat 201 of FIG. 11—e.g., including a curved body 502 with an outward facing side 504 having a convex curvature, an inward facing side 506 having a concave curvature, a first edge or end 508, and a second edge or end 510. A hooking or engaging track 512 is formed at first edge 508 of body 502—the engaging track 512 having the same general configuration as slat 201 of FIG. 11—and a receiving track 514 is formed at second edge 510 of the body 502. The receiving track 514 requires less forming stations (i.e., less bends to arrive at the final shape of receiving track 514) than other examples.

Similar to FIG. 11, the shutter slat 501 in FIG. 14 includes a first edge bend 509 forming an interior angle 511*b* between the engaging track 512 and the convex side (i.e., outward facing side 504) of the body 502, where a transition point 511*a* is formed between the outward facing side 504 and the engaging track 512. In the example depicted as shutter slat 501 the transition point 511*a* is located on the outward side of point 512*d* (i.e., outward side of vertical plane G').

Receiving track 514 comprises a base 546, a guard member 516, and a lip member 518. Base 546 extends from edge 510 of body 502, and projects toward the outward facing side 504 of the body. Guard member 516 extends from the base 546. Base 546 and guard member 516 define an interior space or receptacle 530 for receiving an end retention device. An opening or aperture 548 into receptacle 530 may be formed between edge 510 of body 502 and the guard member 516 at a guard member point 522. In some examples, base 546 forms a lip 546*a* at edge 510 and/or guard member point 522 may form a lip 522*a*, such that the width of aperture 548 is smaller than the interior width of receptacle 530 to assist in retaining an end retention device within receptacle 530.

Lip member 518 extends from guard member 516 and includes a hook-shaped portion comprising a shank 518*a*, a bend 518*b*, a barb 518*c*, and a point 518*d* that are sized and shaped to engage with engaging track 512 of another slat. Shank 518*a* extends from guard member 516 in a generally vertical direction (i.e., in a direction similar to the length of the body 502). Bend 518*b* extends from the shank 518*a* and curves toward outward facing side 504 of body 502. Lip member 518 and guard member 516 define an interior articulation space 528 within receiving track 514, that is sized and shaped to receive the hook-shaped portion of the engaging track 512 of another slat. Barb 518*c* and/or point 518*d* are spaced apart from guard member 516 to form an opening or aperture 526 into articulation space 528, that is sized and shaped to receive the engaging track 512 of another slat. In some examples, receiving track 514 does not project beyond (i.e., below or past the inward facing side of) the concave curvature H of the inward facing side 506 of body 502. In further examples, guard member point 522 and/or at least a portion of shank 518*a* and/or bend 518*b* are positioned approximately along the concave curvature H of outward facing side 504 of body 502. In further examples, engaging track 512 does not project beyond (i.e., above or past the outward facing side of) the convex curvature F' of the outward facing side 504 of body 502. Articulation space aperture 526 and receptacle aperture 548 open toward opposing sides of body 502. For example, articulation space aperture 526 opens towards the outward facing side 504 of body 502 and receptacle aperture 548 opens toward the inward facing side 506 of body 502.

Although described herein as embodiments of a rolling shutter, the term "slat" may also refer to a curtain, screen, grille, or other covering for an opening that is retractable by stacking the components, such as by coiling or winding. For example, the term "slat" may include the stacking links of a coiling grille. Further, while particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A slat for a rolling shutter, comprising:
- a bent, unbranched sheet, comprising:
  - a curved body having a convex outward facing side and a concave inward facing side, and opposite first and second ends;
  - an engaging track disposed at the body first end;
  - a receiving track disposed at the body second end, including an aperture that is sized and shaped to receive an engaging track;
- a bend formed between the body inward facing side and the receiving track, the bend having an interior angle of less than 180°; and
- a separately formed receptacle that is sized and shaped to receive an end retention device, the receptacle coupled to the body inward facing side at the body second end, adjacent to the receiving track;
- wherein the inward facing side of the body coupled to the receptacle and the receiving track at the bend conform to the shape of the receptacle.

2. The slat of claim 1, wherein the receptacle is coupled to the body by welding.

3. The slat of claim 1, wherein the receptacle is coupled to the body by a fastener.

4. The slat of claim 3, wherein the fastener is a screw.

5. The slat of claim 1, wherein the bend has an interior angle of about 90°.

6. The slat of claim 5, wherein the receptacle has a rectangular cross-section.

7. The slat of claim 1, further comprising a well formed in the body, the well sized and shaped to receive the receptacle on the inward facing side of the body.

8. The slat of claim 7, wherein the well forms a rectangular channel, and the receptacle has a rectangular cross-section.

9. The slat of claim 7, further comprising a rib formed in the body and projecting toward the inward facing side, wherein the well is defined by the rib and the receiving track.

10. The slat of claim 7, wherein the receptacle is friction fit in the well.

11. The slat of claim 1, wherein the receiving track comprises a guard member and a lip member, the guard member extending from the body second end and projecting toward the body inward facing side, and the lip member extending from the guard member and having a hook-shaped portion that is sized and shaped to engage the engaging track of another slat;
- wherein the body inward facing side and the guard member conform to the receptacle.

12. The slat of claim 11, wherein the body inward facing side and the guard member form a right angle, and the receptacle has a rectangular cross-section.

13. The slat of claim 11, wherein the guard member and lip member define an interior articulation space that is sized and shaped to receive the engaging track of another slat, the lip member having a point that is spaced apart from the guard member to form the receiving track aperture.

* * * * *